United States Patent Office 2,820,775
Patented Jan. 21, 1958

2,820,775

STABILIZED POLYETHYLENE COMPOSITIONS

Malcolm Chamberlain, Raymond H. Rigterink, and Charles L. Stacy, Jr., Midland, Mich., assignors to The Dow Chemical Company, Midland, Mich., a corporation of Delaware No Drawing. Application November 10, 1955
Serial No. 546,282

4 Claims. (Cl. 260—45.95)

This invention relates to compositions of polyethylene and like polymers which are stabilized to thermal oxidation and has for its principal object the provision of such compositions.

According to the present invention, a polyethylene or like composition which is stabilized to thermal oxidation is comprised of polyethylene and an antioxidant material which is a member of the 4,4'-methylene-bis-(2,6-dialkyl phenol) class of compounds which may structurally be represented by the general formula:

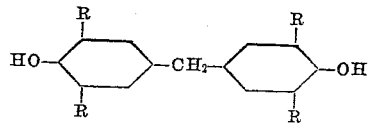

wherein R is an alkyl group which may contain from one to eight carbon atoms. The compounds 4,4'-methylene-bis-(2,6-ditertiarybutyl phenol); 4,4'-methylene-bis-(2,6 - xylenol); 4,4' - methylene - bis - (2,6 - diisopropyl phenol); and 4,4' - methylene - bis - (2,6-dicyclohexyl phenol) are typical of the members of the class which may beneficially be utilized in polyethylene compositions according to the present invention. An amount of antioxidant between about 0.0005 and 2.0 percent by weight, based on the weight of the polyethylene or like polymer, may advantageously be incorporated in the composition to render it stable to thermal oxidation. Ordinarily, an amount of about 0.1 percent by weight may satisfactorily be employed.

In a series of illustrative examples, polyethylene compositions containing about 0.1 percent by weight of several different 4,4'-methylene-bis-(2,6-dialkyl phenol) compounds as antioxidants were exposed to oxygen at a temperature of about 150° C. to observe their stability to thermal oxidation. They had relative degrees of stabilization to thermal oxidation which were represented by the numerical values for the various compounds in the following table. The numerical values represent relative degrees of stability of the various stabilized compositions on an arbitrarily selected rating scale in which conventionally employed stabilizers for polyethylene have numerical values between about 10 and 140.

| Antioxidant compound | Relative degree of stabilization |
|---|---|
| 4,4'-methylene-bis-(2,6-ditertiarybutyl phenol) | 44.6 |
| 4,4'-methylene-bis-(2,6-xylenol) | 28.2 |
| 4,4'-methylene-bis-(2,6-diisopropyl phenol) | 33.1 |
| 4,4'-methylene-bis-(2,6-dicyclohexyl phenol) | 23.2 |

In comparison, unstabilized polyethylene had a degree of stabilization according to this procedure of about 1.1.

Polyethylene of any nature may advantageously be utilized for preparing compositions according to the present invention. The polymers of ethylene which are employed may, for example, be similar to those which may be obtained by polymerizing ethylene in a basic aqueous medium and in the presence of polymerization-favoring quantities of oxygen under relatively high pressures in excess of 500 or 1,000 atmospheres at temperatures between 150 and 275° C. Or, if desired, they may be similar to the essentially linear and unbranched polymers ordinarily having greater molecular weights which may be obtained under relatively low pressures of 1 to 100 atmospheres using such catalysts to polymerize the ethylene as mixtures of strong reducing agents and compounds of group IV–B, V–B and VI–B metals of the Periodic System; chromium oxide on silicated alumina; hexavalent molybdenum compounds; and charcoal supported nickel-cobalt.

What is claimed is:

1. A polyethylene composition stabilized to thermal oxidation which comprises polyethylene and between about 0.0005 and 2.0 percent by weight of an antioxidant material which is a member of the 4,4'-methylene-bis-(2,6-dialkyl phenol) class of compounds having the general formula:

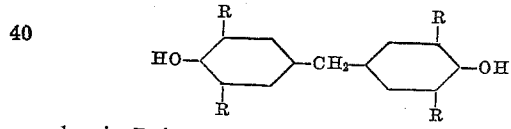

wherein R is an alkyl radical that is selected from the group consisting of isopropyl and tertiarybutyl radicals.

2. The composition of claim 1 wherein the antioxidant is 4,4'-methylene-bis-(2,6-ditertiarybutyl phenol).

3. The composition of claim 1 wherein the antioxidant is 4,4'-methylene-bis-(2,6-diisopropyl phenol).

4. A composition according to claim 1 which comprises polyethylene and about 0.1 percent by weight of the antioxidant.

References Cited in the file of this patent

UNITED STATES PATENTS

| 2,295,985 | Baird et al. | Sept. 15, 1942 |
| 2,434,662 | Latham et al. | Jan. 20, 1948 |
| 2,538,355 | Davis | Jan. 16, 1951 |
| 2,727,879 | Vincent | Dec. 20, 1955 |
| 2,748,096 | Lambert et al. | May 29, 1956 |

Notice of Adverse Decision in Interference

In Interference No. 90,947 involving Patent No. 2,820,775, M. Chamberlain, R. H. Rigterink, and C. L. Stacy, Jr., Stabilized polyethylene compositions, final judgment adverse to the patentees was rendered Apr. 18, 1962, as to claims 1, 2, and 3.

[*Official Gazette June 12, 1962.*]